March 16, 1954  R. O. GRUBEL ET AL  2,672,426
METAL-CERAMIC BODIES AND METHOD OF MAKING
Filed Dec. 14, 1950
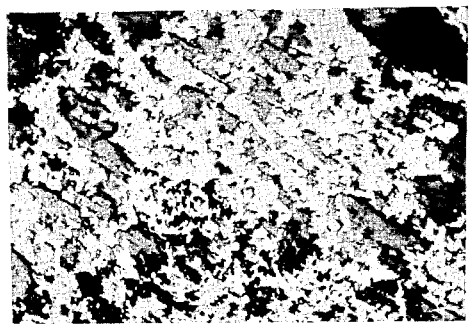
INVENTORS
Ralph O. Grubel
Lee S. Busch
BY
Nicholas Langer
ATTORNEY Patented Mar. 16, 1954

2,672,426

UNITED STATES PATENT OFFICE 2,672,426

METAL-CERAMIC BODIES AND METHOD OF MAKING

Ralph O. Grubel and Lee S. Busch, Indianapolis, Ind., assignors to P. R. Mallory & Co., Inc., Indianapolis, Ind., a corporation of Delaware Application December 14, 1950, Serial No. 200,801

14 Claims. (Cl. 117—121)

This invention relates to metal-ceramic compositions and to a method of making the same.

It is an object of the present invention to provide novel types of compositions or materials comprising a metallic constituent and a ceramic constituent.

It is another object of the present invention to provide metal-ceramic compositions in which the desirable properties of both the metallic and of the ceramic constituents are preserved and combined.

It is a further object of the invention to provide metal-ceramic compositions in which the metallic constituent forms a porous, continuous matrix, the pores of which are filled with a ceramic, said compositions being characterized by good resistance to thermal shock, high strength at elevated temperatures, better resistance to oxidation and corrosion than that of the metallic constituent itself and being further characterized by a thermal and electrical conductivity which are superior to those of the ceramic constituent.

The invention also contemplates metal-ceramic compositions of the character described which may be readily manufactured on a practical and industrial scale at a low cost.

Other and further objects and advantages of the invention will become apparent from the following description, taken in conjunction with the accompanying drawing, which is an enlarged sectional view of the microstructure of a molybdenum-ceramic composition embodying the principles of the present invention.

Broadly stated, the metal-ceramic compositions of the invention comprise a porous metallic matrix or phase, the pores of which are impregnated or filled with the ceramic phase. The said compositions derive their unusual properties from their method of preparation yielding a porous metallic phase in which the neighboring or adjoining portions are all interconnected thereby providing for passage of heat continuously through the said metallic phase. Thus, the thermal and electrical conductivity and the thermal shock resistance of the metal are effectively preserved and are combined with the desirable properties of the ceramics filling out the pores of the metallic phase. Ceramics lend to the metal-ceramics of the invention their special properties of oxidation and corrosion resistance and strength at elevated temperatures.

The preferred method of making the metal-ceramic compositions of the invention comprises, in general, compacting the powdered metallic constituent, sintering the powder compact to further consolidate and strengthen the same and to increase its electrical and thermal conductivity, and impregnating this porous base with the ceramic constituent in the molten state. A minor proportion of a pore forming agent may be admixed with the powdered metallic constituent.

Materials which can be used as the metallic component of the metal-ceramic bodies of the invention may be classified as metals and metal borides, carbides or nitrides, as it will appear from the following list:

*Metals.*—Boron, chromium, cobalt, columbium, hafnium, iridium, iron, molybdenum, nickel, osmium, palladium, platinum, rhenium, rhodium, ruthenium, tantalum, thorium, titanium, tungsten, vanadium, zirconium.

*Borides.*—Barium boride, calcium boride, chromium monoboride, cobalt monoboride, iron boride, manganese monoboride, manganese diboride, nickel boride, thorium tetraboride, thorium hexaboride, zirconium boride.

*Carbides.*—Barium carbide, beryllium carbide, boron carbide, calcium carbide, cerium carbide, trichromium dicarbide, pentachromium dicarbide, hafnium carbide, iron carbide, molybdenum monocarbide, dimolybdenum carbide, molybenum dicarbide, samarium carbide, silicon carbide, tantalum carbide, thorium carbide, titanium carbide, tungsten carbide, uranium carbide, vanadium carbide, zirconium carbide.

*Nitrides.*—Aluminum nitride, beryllium nitride, boron mononitride, boron dinitride, chromium mononitride, columbium mononitride, iron nitride, magnesium nitride, silicon nitride, tantalum nitride, titanium nitride, vanadium nitride.

The ceramic constituent may be of such refractory oxide or oxides as will fit the operating conditions to which the material will be subjected and have an affinity for the metallic constituent. Complete impregnation of the metallic matrix or sponge is greatly facilitated if the surface presented to the molten ceramic is wet by the ceramic. Photomicrographic study indicates that the metallic surface is wet by the ceramic if its surface tension is low enough; i. e., if the ceramic is very fluid at the impregnating temperature. The principal considerations determining the choice of the ceramic constituent for a particular application are its melting point and fluidity within the range of temperatures practical for use as limited by the properties of the metallic constituent, such as melting point.

The characteristics of the metallic sponge base, such as its microstructure, including density and porosity are determined by a number of factors, such as the particle size of the metal powder, the compacting pressure, the time and temperature of sintering, and the like. In many cases it is desirable to admix a suitable pore forming agent to the powder mixture. This is a material which produces a gas or vapor under sintering conditions and thereby increases the porosity of the sintered metal sponge or base. If the use of the metal-ceramic material demands a large percentage, by volume, of the metallic constituent to be present, the amount of pore forming agent is kept low, or eliminated, and the time and temperature of sintering may be increased. However, in sintering at a higher temperature, care must be taken not to destroy the intercommunicating passages between the pores. The particle size distribution must be such as to give proper pore shape as well as the proper degree of porosity. The factors of sintering time and temperature have an important effect on these characteristics. The atmosphere in which the sintering operation is carried out must be one which will not impede the welding together of the particles, nor change the metallic constituent in any way. The range of porosities available by this method of forming the metal sponge extends from about 50% to about 80% by volume.

The ceramic constituent may be impregnated into the metal sponge either directly from a compacted briquette of primary ceramic powder constituents or from a ceramic material whose components have already been melted and diffused. The temperature of impregnation must be above the melting point of the ceramic and must produce the fluidity necessary for the ceramic to flow into the pores. For impregnation, the metallic sponge is brought into such relative position with respect to the molten bath of ceramic that the ceramic will impregnate due to capillarity of the sponge, or as a result of gravity, or a combination of both factors. It is also possible to force the molten ceramic into the pores of the sponge, for example, by placing the ceramic bath under pressure in a suitable atmosphere within a closed impregnation vessel.

The atmosphere in which the impregnating operation is carried out is preferably one that will not adversely affect the ceramic or the metallic sponge. As an example of the effect of impregnating atmosphere, it has been found that a hydrogen atmosphere will more readily be absorbed into a molten ceramic than will an atmosphere of argon. Upon solidifying in the hydrogen atmosphere, many more bubbles are present in the ceramic excess which remains outside the metallic sponge than when an argon atmosphere is used. In other words, the use of an argon atmosphere may be more desirable under certain conditions.

The ceramic materials suitable for use in the metal-ceramic compositions of the invention include ceramics in which one or more of the following metal oxides are major constituents: Aluminum oxide, beryllium oxide, calcium oxide, lead mono-oxide, lithium oxide, magnesium oxide, silicon dioxide, titanium dioxide and zirconium dioxide. Examples of preferred combination of metals, or metallic substances, and ceramics are the following:

*Chromium.*—70% $Na_2O.SiO_2$, 27% $Al_2O_3.SiO_2$, 3% $CaO.SiO_2$.
*Nickel.*—$PbO.SiO_2$.
*Molybdenum.*—$5CaO.3Al_2O_3$.
*Tungsten.*—$BeO.Al_2O_3$.
*Chromium monoboride.*—$MgO.2TiO_2$.
*Titanium nitride.*—$4MgO.5BeO.3ZrO_2$.
*Dimolybdenum carbide.*—
$$LiO_2.Al_2O_3.4SiO_2+4SiO_2.$$
*Tungsten carbide.*—$MgO.2TiO_2$.

In general, suitable materials for the impregnation of molybdenum have been found to be compounds or combinations of compounds from the lime-alumina system, such as 50% lime and 50% alumina, or $5CaO.3Al_2O_3$. However, there is no limitation on the ceramics which may be used in combination with molybdenum except as will arise from the operating conditions under which the finished product will be used. Experience has shown that ceramics high in silica impregnate molybdenum with difficulty.

The single figure of the drawing is a photomicrograph of an unetched specimen, taken at a magnification of 200X, showing the microstructure of a molybdenum-ceramic in which the white areas are molybdenum and the gray and black areas are the ceramic constituent. This specimen has been prepared by first making a porous molybdenum sponge from molybdenum powder by pressing and sintering and then impregnating the said sponge in a bath of the molten ceramic. From this photomicrograph, the continuity of the metallic phase and its effectiveness in improving the heat conductivity over a solid ceramic body can be readily seen. It should also be noted that, after sintering the sponge and impregnating it, the molybdenum phase was left with very irregular contours surrounding its pores. The ceramic has filled all of the irregularities and thus there has been produced a very strong mechanical bond between the metallic and the ceramic constituents.

In order that those skilled in the art may have a better understanding of the invention, the following illustrative example may be given with reference to the manufacture of a molybdenum-lime-alumina body.

*Example*

The molybdenum powder having an average particle size of 4.5 microns was mixed with a pore forming agent, ammonium bicarbonate, in the ratio of 80% molybdenum and 20% bicarbonate, by weight. This mixture was pressed into a briquette at a pressure of 2.5 tons per square inch and sintered in a reducing atmosphere of cracked ammonia for 1 hour at 1300° C. The shrinkage was about 3%, linearly. The sintered sponge thus produced had a porosity of about 75%.

The ceramic with which this sponge was impregnated was an eutectic between two lime-alumina compounds, $3CaO.Al_2O_3$ and $5CaO.3Al_2O_3$, which occurs at 50% lime and 50% alumina by weight and has a melting point of 1395° C. A briquette of 50% powdered lime and 50% powdered alumina was compacted. It was next melted at 1550° C. to achieve diffusion between the lime and the alumina before it was impregnated in order to get uniform composition throughout the ceramic phase. The melting operation was carried out in a graphite boat lined with molybdium sheet.

To impregnate this ceramic into the molybdenum sponge, the sponge was placed in a graphite boat lined with molybdenum with slight clearance on all sides of the sponge. The sides of the boat were high enough to contain the ceramic. The ceramic, in amount exceeding by 25% by volume the total volume of the sponge pores, was placed on top of the sponge and the boat was stoked slowly into a furnace containing a cracked ammonia atmosphere at a temperature of 1700° C. It was left in the heat zone for 15 minutes and then stoked slowly into the cooling chamber. Excess ceramic was ground off the outside until only a thin layer remained to protect the molybdenum from oxidation.

The material prepared in accordance with the procedure just described was capable of withstanding severe thermal shock as indicated by actual tests. The thermal shock test consisted of ten cycles of heating and cooling, each cycle being as follows:

The sample was placed into a chamber at 1000° C. and left for 10 minutes, then it was removed and placed in a blast of cold air from a fan. The heating chamber was an inclined stack in which combusted gases from an adjacent combustion chamber were caused to impinge on the specimens. Heat was also transmitted to the specimens by radiation from the walls of the stack and combustion chamber. The molybdenum-ceramic compositions of the example successfully withstood this test and gave no evidence of cracking.

Examples of other practically valuable metal-ceramic compositions are the following:

A metal-ceramic material composed of the relatively low melting point metal, nickel (melting point 1452° C.) and the ceramic $PbO.SiO_2$. This combination is possible because the melting point of the ceramic impregnant, 766° C., permits impregnation at 1000° C. which does not cause pore closure in the nickel sponge. This nickel-ceramic has a composition ranging from about 30% to about 70% nickel by volume.

A metal ceramic material composed of chromium and of the ceramic

27% $Al_2O_3.SiO_2$+3% $CaO.SiO_2$+70% $Na_2O.SiO_2$

The ceramic melts at about 900° C. and impregnates at 1200° C. to 1300° C. which is sufficiently below the melting point of chromium to prevent closing of the pores. This chromium-ceramic has a composition ranging from about 30% to about 70% chromium by volume.

A metal-ceramic material composed of the high melting point metal molybdenum (2620° C.) and the ceramic $5CaO.3Al_2O_3$. This ceramic melts at 1455° C. and impregnates at 1750° C.

A metal-ceramic material composed of the high melting point metal tungsten (3370° C.) and the ceramic $BeO.Al_2O_3$. The melting point of this ceramic is 1890° C. and it impregnates at 2200° C.

A metal-ceramic material composed of the carbide $Mo_2C$ as the metallic component and $Li_2O.Al_2O_3.4SiO_2$+$4SiO_2$ as the ceramic component. The melting point of this ceramic is 1420° C. and it impregnates at 1750° C. The composition of this metal-ceramic may range from about 30% to about 70% $Mo_2C$ by volume.

A metal-ceramic material composed of the carbide WC as the metallic component and $MgO.2TiO_2$ as the ceramic component. The melting point of this ceramic is 1670° C. and it impregnates at 2000° C. The composition of this metal-ceramic may range from about 30% to about 70% WC by volume.

A metal-ceramic material composed of the boride CrB as the metallic component and $MgO.2TiO_2$ as the ceramic component. The melting point of this ceramic is 1670° C. and it impregnates at 2000° C. The composition of this metal-ceramic may range from about 30% to about 70% CrB by volume.

The principal practical applications of the metal-ceramic compositions of the invention are the following:

1. High and medium temperature structural materials for jet and rocket engines, e. g. turbojet engine blading.
2. Die materials for hot forming (hot pressing) certain materials, such as minerals, which must be free of carbon.
3. Containers for high temperature furnace work, e. g. boats and fixtures.
4. Fixtures for welding and brazing which are resistant to the attack of the fluxes used as well as are resistant to thermal shock.
5. Secondary emission materials wherein the ceramic constituent comprises the elements beryllium, bismuth, barium or magnesium.
6. Atomic energy applications, such as low neutron absorbers, where resistance to thermal shock, high strength at elevated temperatures or formability are important.
7. Electric contact materials.
8. Spark-plug electrodes.

Although the present invention has been described in conjunction with a few preferred embodiments, variations and modifications may be resorted to as those skilled in the art will readily understand. Such variations and modifications are considered within the purview of the specification and the scope of the claims.

We claim:

1. The method of making metal-ceramic bodies including a metallic constituent of predetermined melting point and a ceramic constituent of lower melting point essentially composed of metal oxides which comprises forming a porous and continuous matrix of the metallic constituent selected from the group consisting of metals exhibiting refractory properties, borides, carbides and nitrides of such metals, said matrix being characterized by a network of interconnected pores, heating said matrix of the metallic constituent and the ceramic constituent to a temperature above the melting point of the ceramic constituent but below that of the metallic constituent, and bringing said heated constituents into contact with each other thereby to cause substantially complete impregnation of the pores of said matrix with said ceramic constituent.

2. The method of making metal-ceramic compositions including a metallic constituent of predetermined melting point and a ceramic constituent of lower melting point essentially composed of metal oxides which comprises compacting the powdered metallic constituent selected from the group consisting of metals exhibiting refractory properties, borides, carbides and nitrides of such metals, sintering the compact to form a coherent metallic sponge characterized by a porous and continuous metallic matrix and by a network of interconnected pores, heating the ceramic constituent at a temperature above its melting point but below the melting point of the metallic constituent, and bringing said sponge into contact with the ceramic constituent in the molten phase thereby to cause substantially complete impregnation of the pores of said sponge with said ceramic constituent.

3. The method of making metal-ceramic compositions including a metallic constituent of predetermined melting point and a ceramic constituent of lower melting point essentially composed of metal oxides which comprises mixing the powdered metallic constituent selected from the group consisting of metals exhibiting refractory properties, borides, carbides and nitrides of such metals with a minor portion of a powdered pore-forming agent, pressing the resulting mixture to form a compact, sintering said compact to form a continuous porous matrix characterized by a network of interconnected pores, and heating said matrix and the ceramic constituent while in contact with each other at a temperature above the melting point of said ceramic constituent but below that of said matrix to cause substantially complete impregnation of the pores of the matrix with the ceramic constituent in the molten phase.

4. The method of making metal-ceramic compositions including a metallic constituent of predetermined melting point and a ceramic constituent of lower melting point essentially composed of metal oxides which comprises compacting the powdered metallic constituent selected from the group consisting of metals exhibiting refractory properties, borides, carbides and nitrides of such metals, sintering the compact to form a coherent body characterized by a continuous porous matrix and by a network of interconnected pores, heating at least the ceramic constituent at a temperature above its melting point but below that of said sintered body, and contacting the molten ceramic constituent with said body to cause substantially complete impregnation of the pores thereof, said ceramic constituent having such characteristics in the molten phase as to wet the metallic constituent.

5. The method of making a molybdenum-ceramic body which comprises pressing a compact from molybdenum powder, sintering said compact under non-oxidizing conditions to produce a sintered molybdenum body characterized by a porous continuous matrix and a network of interconnected pores, heating a ceramic material essentially composed of metal oxides and having a melting point below that of molybdenum to a temperature at which it is converted into the molten phase but below the melting point of molybdenum, and bringing said molybdenum body into contact with said molten phase to cause substantially complete impregnation of the pores of said body.

6. The method of making a molybdenum-ceramic body which comprises uniformly mixing molybdenum powder with a minor portion of a powdered pore-forming agent, pressing a compact from said mixture, sintering the compact formed in a reducing atmosphere at a temperature of about 1300° C. to produce a continuous molybdenum matrix characterized by a network of interconnected pores, and heating said matrix together with a ceramic material essentially composed of metal oxides selected from the group of lime-alumina compounds and having a lower melting point than molybdenum at a temperature above the melting point of the ceramic material but below the melting point of molybdenum thereby to cause substantially complete impregnation of the pores of said matrix.

7. A metal-ceramic composition comprising a porous continuous metallic matrix, having a network of interconnected pores, of a metallic material selected from the group consisting of metals exhibiting refractory properties, borides, carbides and nitrides of such metals, and fused ceramic material essentially composed of metal oxides having a melting point lower than that of said metallic material substantially completely impregnating the interconnected pores of said metallic matrix and constituting a ceramic matrix, said metallic matrix imparting good thermal conductivity and said ceramic matrix imparting good oxidation and corrosion resistance to the composition whereby said composition is characterized by high resistance to thermal shock and by high strength at elevated temperatures.

8. A metal-ceramic composition as claimed in claim 7 wherein the metallic matrix is in the form of a sintered powder compact.

9. A metal-ceramic composition as claimed in claim 7 wherein the ceramic material comprises the eutectic of two refractory oxides.

10. A metal-ceramic composition comprising a porous continuous metallic matrix of molybdenum having a network of interconnected pores, and fused ceramic material essentially composed of metal oxides having a melting point lower than that of molybdenum substantially completely impregnating the interconnected pores of said metallic matrix and constituting a ceramic matrix, said metallic matrix imparting good thermal conductivity and said ceramic matrix imparting good oxidation and corrosion resistance to the composition whereby said composition is characterized by high resistance to thermal shock and by high strength at elevated temperatures.

11. A metal-ceramic composition as claimed in claim 7 wherein the metallic matrix is composed of molybdenum and the fused ceramic material is composed of $5CaO.3Al_2O_3$.

12. A metal-ceramic composition as claimed in claim 7 wherein the metallic matrix is composed of tungsten and the fused ceramic material is composed of $BeO.Al_2O_3$.

13. A metal-ceramic composition as claimed in claim 7 wherein the metallic matrix is composed of dimolybdenum carbide and the ceramic material is composed of a fused mixture of $$Li_2O.Al_2O_3.4SiO_2 + 4SiO_2$$

said composition containing from about 30% to about 70% dimolybdenum carbide by volume.

14. A metal-ceramic composition as claimed in claim 7 wherein the metallic matrix is composed of tungsten carbide and the ceramic material is composed of fused $MgO.2TiO_2$, said composition containing from about 30% to about 70% tungsten carbide by volume.

RALPH O. GRUBEL.
LEE S. BUSCH.

References Cited in the file of this patent

UNITED STATES PATENTS

| Number | Name | Date |
| --- | --- | --- |
| 2,370,242 | Hensel et al. | Feb. 27, 1945 |

OTHER REFERENCES

Chemical and Engineering News, volume 26, No. 45, November 8, 1948, pages 3362–63.